Patented Mar. 26, 1929.

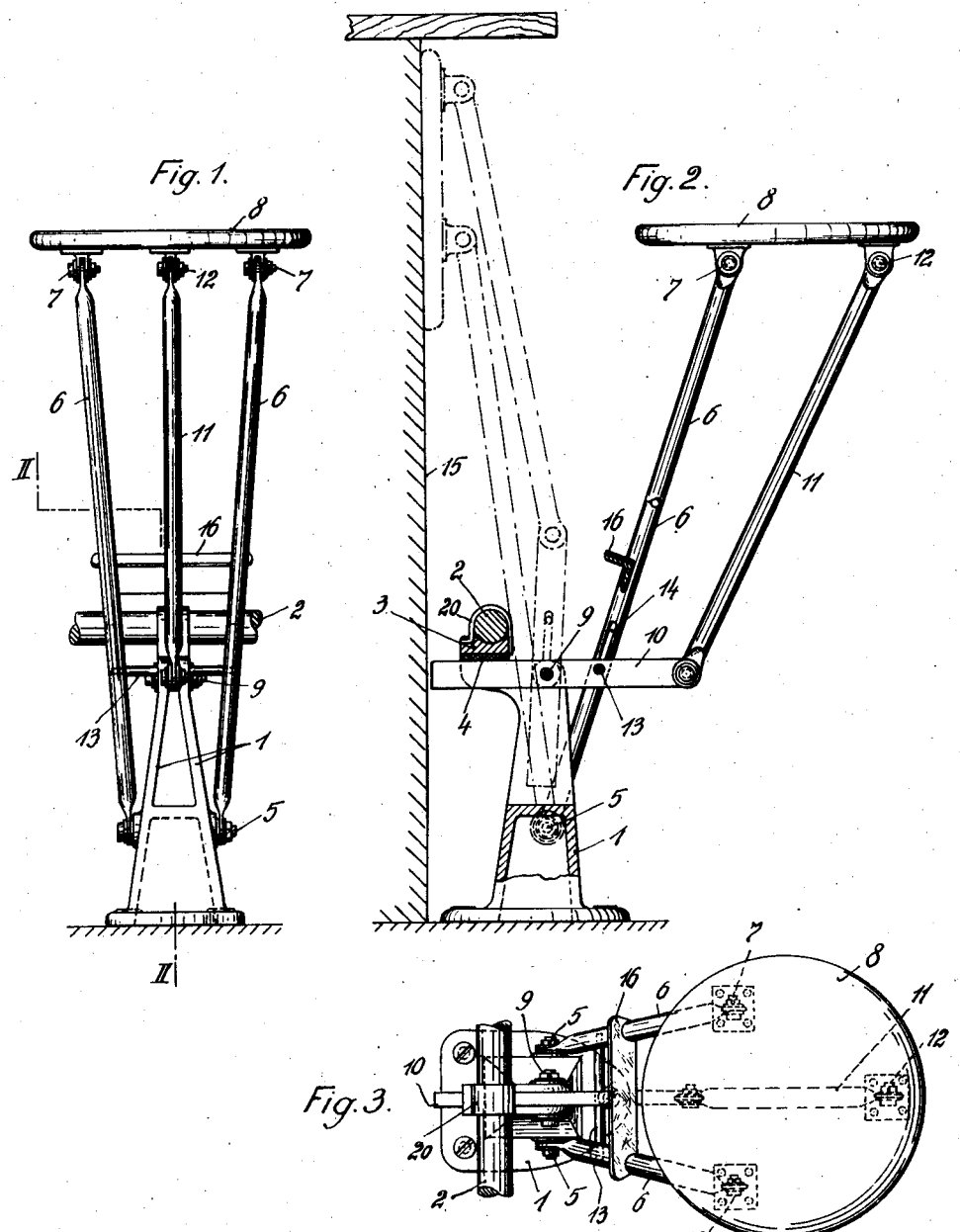

1,706,790

UNITED STATES PATENT OFFICE.

ROBERT LEDERER, OF BERLIN-WILMERSDORF, GERMANY.

FOLDING SEAT.

Application filed May 24, 1928. Serial No. 280,307.

My invention refers to folding seats and more especially to seats adapted for use in bars, restaurants and the like. It is an object of my invention to provide means whereby a seat hinged to a support near the bar may be folded against the bar and unfolded with the greatest ease, so that if no seat is wanted, the space otherwise occupied by such seat is available for other purposes.

In the drawings affixed to this specification and forming part thereof a folding seat embodying my invention is illustrated diagrammatically by way of example.

In the drawings,

Fig. 1 is a rear view,

Fig. 2 is a side elevation, partly in cross-section, showing the seat in full lines in unfolded condition and in dot and dash lines in folded condition.

Fig. 3 is a plan view corresponding to Fig. 2.

Referring to the drawings, 1 is a standard or pillar serving as a support for the folding seat and fixed to the floor near the bar 15. 2 is a rail mounted in front of and extending in parallel to the bar and 3 is one of a number of blocks held in place on the rail 2 by means of a clip 20 and having a rubber cushion 4 fixed to its underside. 5 is an axle extending across the standard 1 and 6, 6 are the two front struts forming part of the seat which are hinged at 7 to the bottom 8. 9 is another axle supported by the standard 1 above the axle 5 and 10 is a double-armed lever capable of rocking about the axle 9, its front end, when the device is unfolded, applying itself from below against the rubber cushion 4. To the rear end of lever 10 is hinged the rear strut 11, which is hinged to the bottom 8 at 12. Across the supporting lever 10 extends a pin 13, the ends of which are guided in longitudinal slots 14 of the front struts 6. 16 is a foot rest connecting the two front struts.

As shown more particularly in Fig. 2, when the seat is unfolded for use, the bottom which carries the weight of the person resting on the seat, is supported by the three struts 6 and 11, the last one of which merely rests on the outer end of the supporting lever 10, while the front struts 6 are supported by the axle 5. The supporting lever 10 is supported in three points, viz, by the axle 9, the pin 13 resting in the bottom ends of the slots 14 and the rubber cushion 4. The dot and dash lines show the position of parts when the seat is folded against the bar.

I wish it to be understood that I do not desire to be limited to the exact details of construction shown and described for obvious modifications will occur to a person skilled in the art.

I claim:—

1. Folding seat comprising a bottom, two front struts hinged to said bottom, means for pivotally supporting the bottom ends of said front struts, a double-armed supporting lever, means for pivotally supporting said lever, a rear strut hinged to said bottom and to one end of said lever and an abutment for the other end of said lever.

2. Folding seat comprising a bottom, two front struts hinged to said bottom, means for pivotally supporting the bottom ends of said front struts, a double-armed supporting lever, means for pivotally supporting said lever, a rear strut hinged to said bottom and to one end of said lever, an abutment for the other end of said lever and a pin secured to said lever and extending into axial slots of said front struts.

3. Folding seat comprising a bottom, two front struts hinged to said bottom, a standard pivotally supporting said front struts, a double-armed supporting lever rockably mounted on said standard, a rear strut hinged to said bottom and to one end of said lever and an abutment for the other end of said lever.

In testimony whereof I affix my signature.

ROBERT LEDERER.